G. W. SMITH.
ENVELOP MACHINE.
APPLICATION FILED DEC. 26, 1913.
1,234,501.
Patented July 24, 1917.
5 SHEETS—SHEET 2.
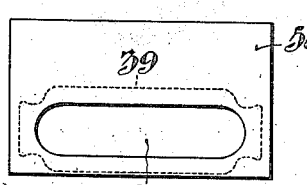
FIG. X.
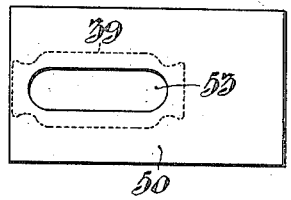
FIG. XII.
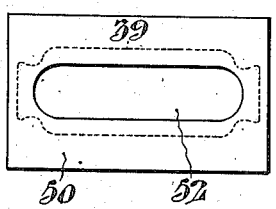
FIG. XI.
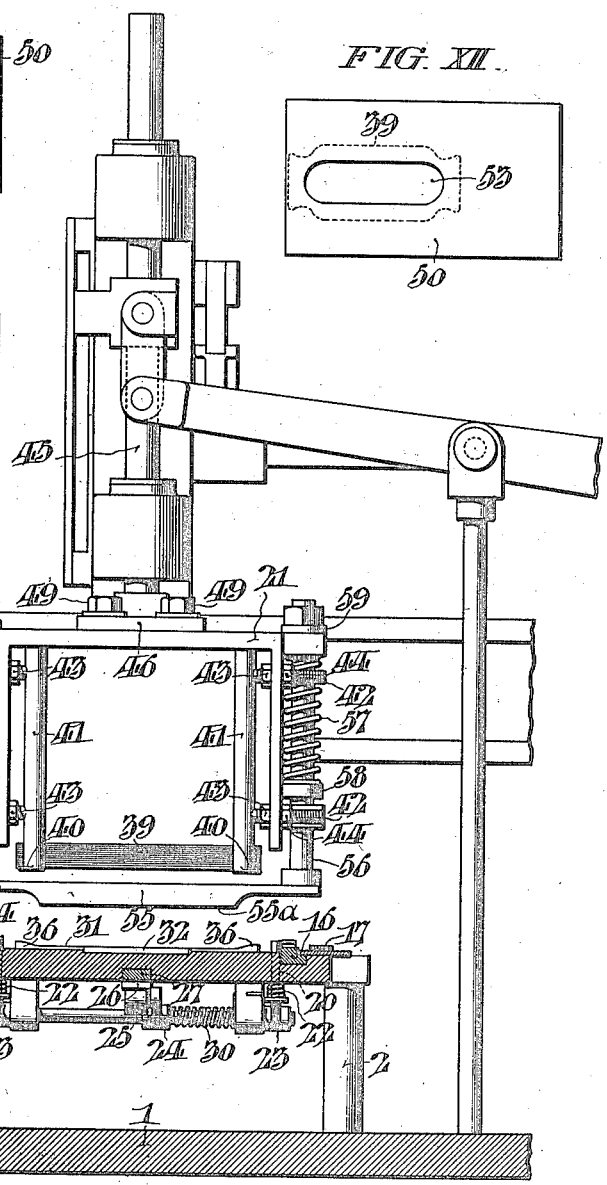
FIG. II.
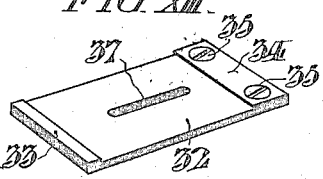
FIG. XIII.
Witnesses
John C. Bergner
James H. Bell
Inventor
George W. Smith,
By Haley & Paul
Attorneys

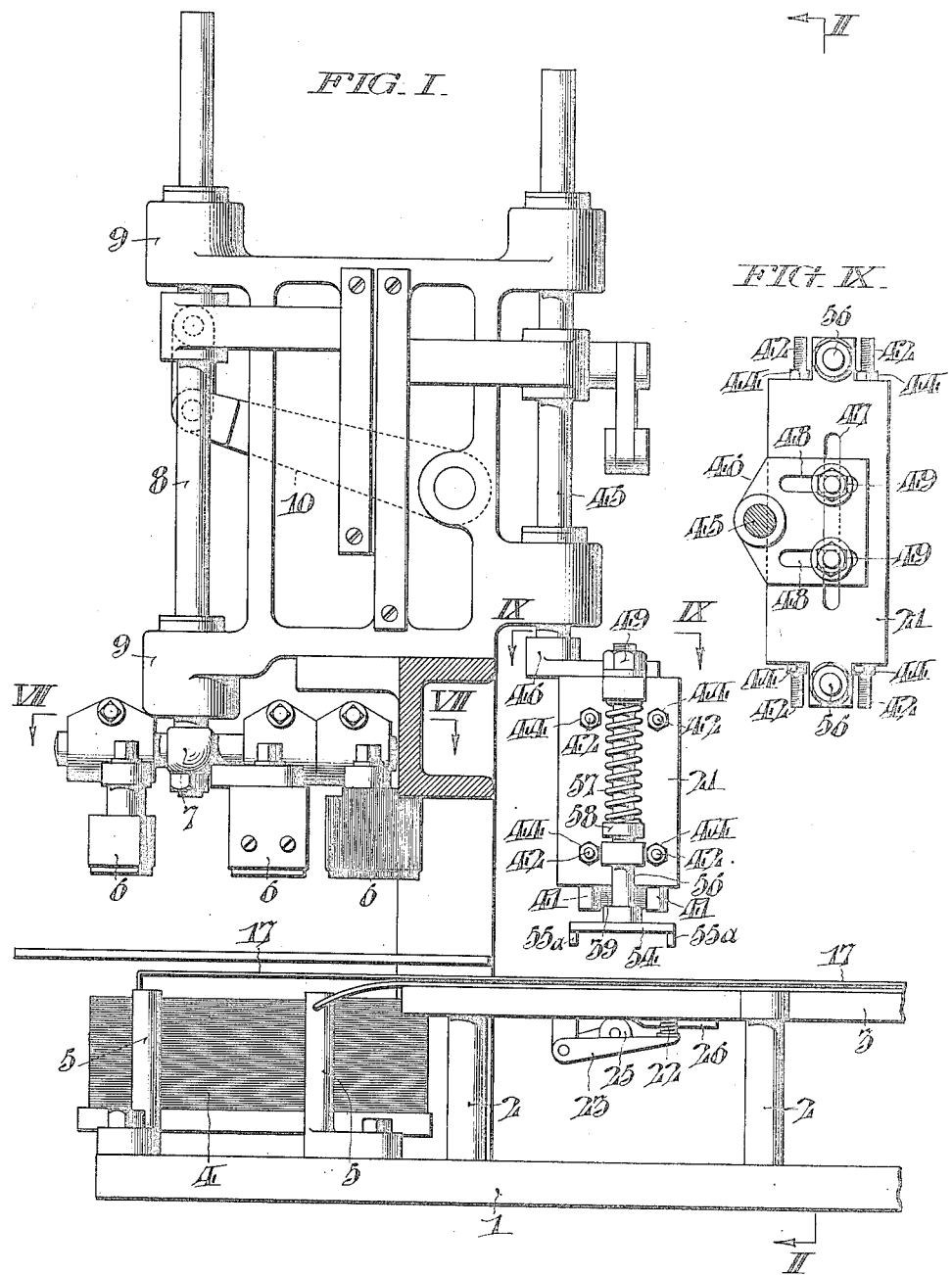

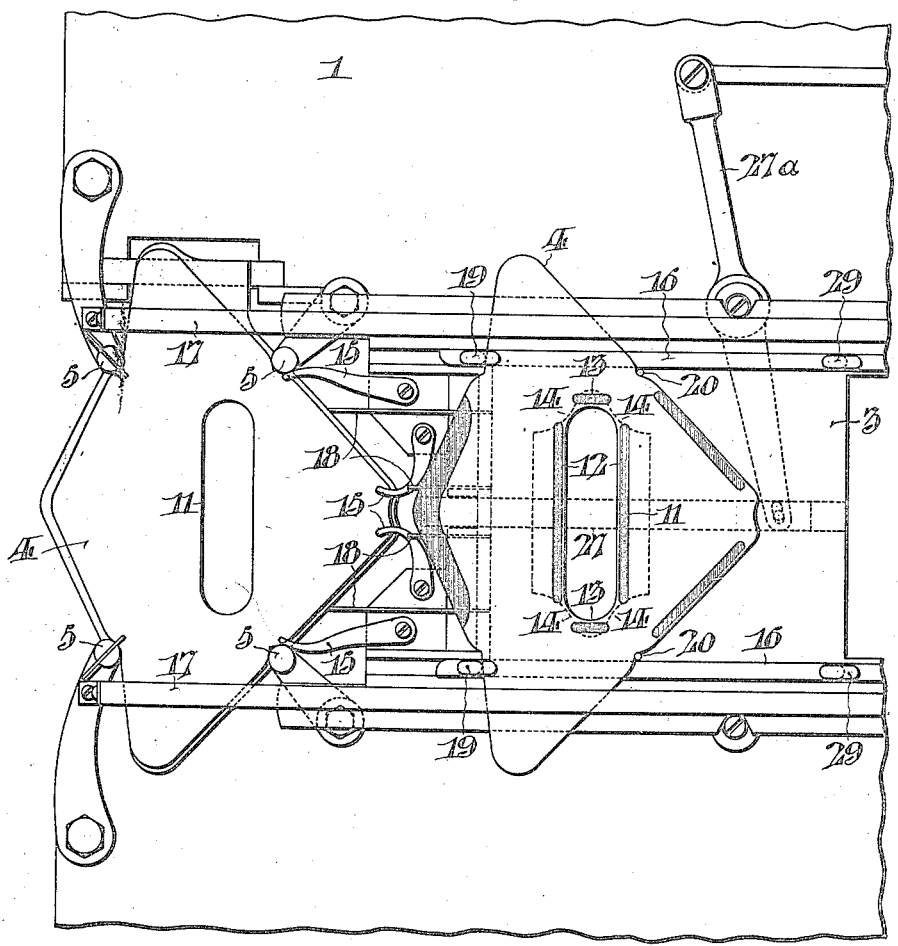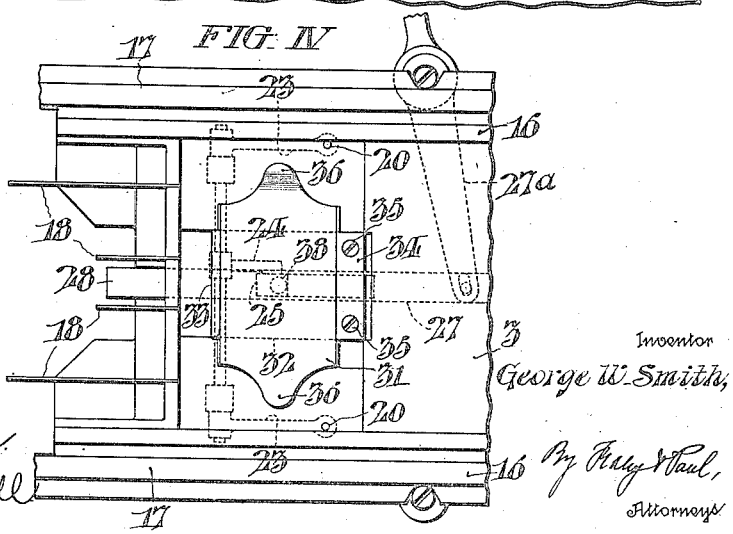

G. W. SMITH.
ENVELOP MACHINE.
APPLICATION FILED DEC. 26, 1913.
1,234,501.
Patented July 24, 1917.
5 SHEETS—SHEET 4.
FIG. V.
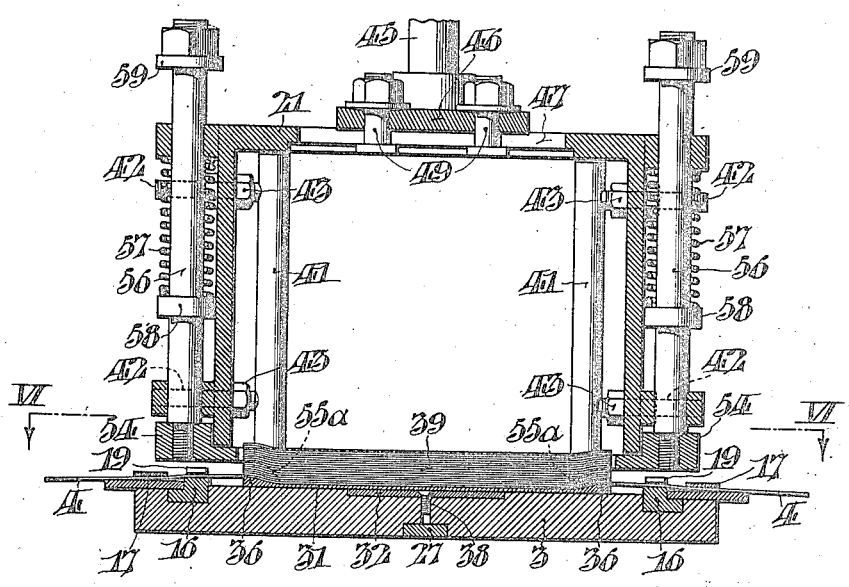
FIG. VI.
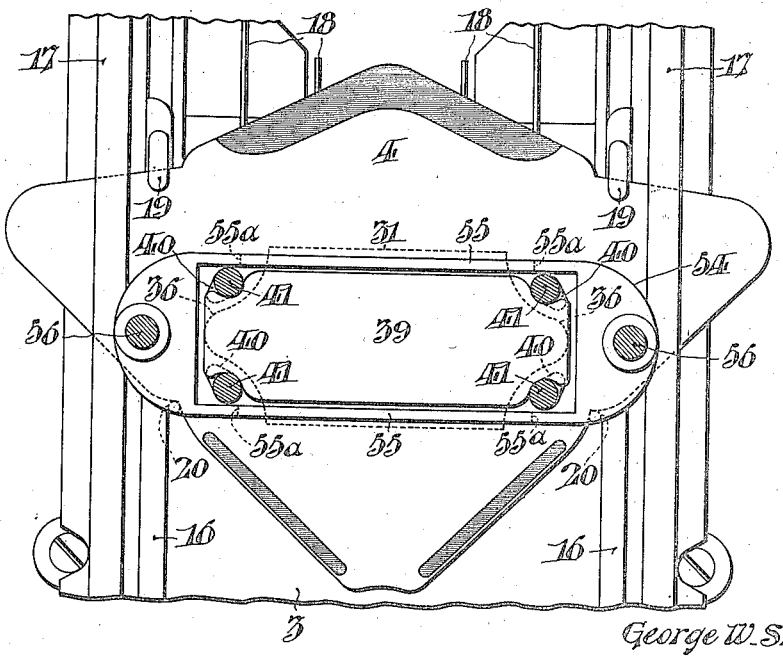
Witnesses
John E. Berger
James H. Bell
Inventor
George W. Smith,
By Fraley & Paul
Attorneys

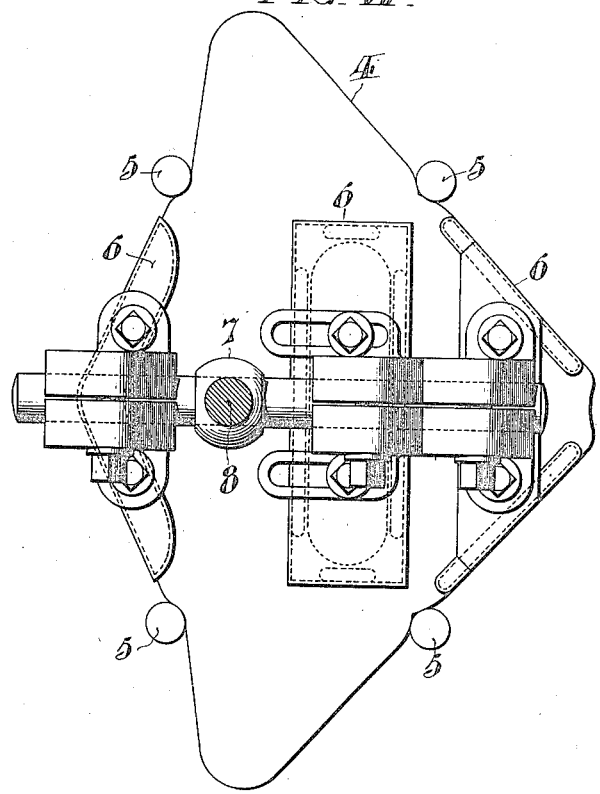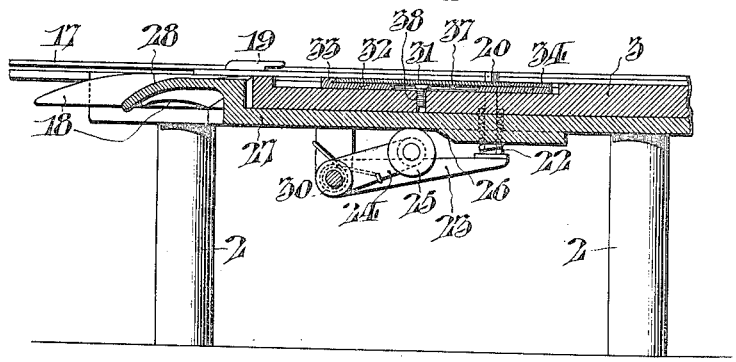

UNITED STATES PATENT OFFICE.

GEORGE W. SMITH, OF PHILADELPHIA, PENNSYLVANIA.

ENVELOP-MACHINE.

1,234,501.

Specification of Letters Patent.

Patented July 24, 1917.

Application filed December 26, 1913. Serial No. 808,655.

*To all whom it may concern:*

Be it known that I, GEORGE W. SMITH, of Philadelphia, in the county of Philadelphia and State of Pennsylvania, have invented certain new and useful Improvements in Envelop-Machines, whereof the following is a specification, reference being had to the accompanying drawings.

The invention relates more particularly to envelop machines which are adapted to apply a transparent patch to an envelop blank for covering an opening therein, whereby the address may be visible through said transparent patch.

An object of the invention is to provide means for applying a patch to an envelop blank, which means may be shifted for changing the location of the patch to correspond to the positioning of the opening in the blank.

A further object of the invention is to provide means for applying the patch to the gummed opening in the envelop blank, which means includes devices for raising the blank into contact with the patch prior to the withdrawing of the patch from the magazine.

A still further object of the invention is to provide means coöperating with the magazine for applying the patches to the blanks, which is movable with said magazine, and which operates to strip the blanks from the magazine.

A still further object of the invention is to provide means for positively positioning the envelop blank relative to the reciprocating magazine which applies the patches to the blank.

These and other objects will in part be obvious and will in part be hereinafter more fully disclosed.

In the drawings which show by way of illustration one embodiment of the invention, Figure I, is a view partly in section and partly in side elevation showing a portion of an envelop machine having my improvements applied thereto.

Fig. II, is a sectional view on the line II, II, of Fig. I.

Fig. III, is a plan view showing the supporting bed, the positioning guides, and the means for moving the blank.

Fig. IV, is a detail in plan showing the construction of the bed directly beneath the magazine for applying the patches to the blanks.

Fig. V, is an enlarged longitudinal sectional view through the magazine, showing the latter in position for applying the patch to the envelop blank.

Fig. VI, is a sectional view on the line VI, VI, of Fig. V.

Fig. VII, is a sectional view on the line VII, VII, of Fig. I.

Fig. VIII, is a longitudinal sectional view through the supporting table.

Fig. IX, is a sectional view on the line IX, IX, of Fig. I.

Fig. X, is a plan view showing an envelop having a patch applied thereto adjacent the lower edge thereof.

Fig. XI, is a detail showing the envelop having a patch applied centrally thereto.

Fig. XII, is a similar view showing the patch applied adjacent one end of the envelop.

Fig. XIII, is a detail in perspective of the holding clamp for the presser plate, which forces the blank into contact with the patch.

The invention consists generally in providing an envelop machine wherein the blanks forming the envelop are gummed and infolded. My invention, however, is directed solely to the means for applying the transparent patch to the blank. The blank, after being gummed is moved onto the supporting table by reciprocating rods having hooked ends for engaging and moving the blank. Coöperating with these feeding rods are positioning guides which engage the opposite side of the blank so that the same is positively held underneath the magazine which supplies the transparent patches to the blank. The magazine is provided with fingers for retaining the patches in the magazine. Said magazine is moved up and down, and when brought into engagement with the blank, there is a presser plate underneath the blank, which raises the blank so that it is caused to contact with the patch in the magazine at each end and along the sides before the patch is stripped from the magazine. This insures a single patch only being withdrawn from the magazine, as the patch is fixed to the blank before it is withdrawn from the magazine, and, therefore, fingers may be provided which will assure only a single patch being drawn from the magazine.

This magazine for applying the patches may be adjusted transversely of the supporting table and also longitudinally of the supporting table so that said magazine may be properly positioned to place the patch on the opening in the blank, whether the opening in the blank is at one side of the envelop or centrally thereof.

Strippers are also provided which move with the magazine for stripping the blank with the patch attached thereto from the magazine.

Referring more in detail to the drawings, my improved envelop machine consists of a supporting bed 1, on which are mounted standards 2, carrying a supporting table 3. The envelop blanks 4, are stacked at the receiving end of the table and are properly held by supports 5, 5. The gum is applied to the envelop blank by gumming devices 6, which are carried by a head 7, mounted at the lower end of a reciprocating rod 8. This rod 8, moves up and down in suitable bearings 9, and is reciprocated by a lever 10, which may be actuated in any convenient way.

The gumming devices are supplied with gum by the ordinary roller which passes underneath the gumming devices when the head 7, is raised. When the gumming devices are lowered onto the blanks, the gum is applied to the blanks at the desired places. As clearly shown in Fig. III, of the drawings, the opening 11, in the envelop blank 4, is supplied with gum along its side edges 12, 12, and along the ends 13, 13, thereof, leaving spaces 14, which are free from gum.

Spring fingers 15, rest on the stack of blanks and the support for the stack is raised in the usual manner in order to keep the blanks up against said fingers. When the gumming head is raised after being brought into contact with the stack of envelop blanks, the upper blank will be lifted with the gumming devices so that the feeding rods 16, may pass underneath the blank and the bars 17, will strip the blank from the gumming device so that it will fall onto these rods. Curved guides 18, serve to raise the back part of the blank as the feed rods move backward so that the blank will, with certainty, be carried onto the supporting table, 3. The feed bars 16, are reciprocated horizontally by suitable means operating in timed relation to the gumming head, and said feed bars are provided with hooks or fingers 19, which engage the blank to move it backward.

Guide pins 20, coöperate with the feeding bars in placing the blank underneath the magazine 21, which supplies the transparent patches to the envelop blank. These pins are normally pressed downward by springs 22, to a position beneath the supporting bed, see Fig. VIII. Levers 23, engage the pins for raising the same. The levers 23, are operated by an arm 24, carrying a roller 25, which coöperates with a cam plate 26, on a reciprocating bar 27. The reciprocating bar 27, is also formed with a rounded off projection 28, which passes underneath the blank to assist in raising the same onto the supporting table. This reciprocating bar 27, is moved in timed relation to the feed bars 16, by a lever 27ᵃ. That is, when said feed bars move underneath the blank, or to the left as viewed in Fig. III, said cam plate 26, will be moved into contact with the roller 25, thus swinging the arm 23, downward and allowing the springs to retract the pins 20, so that the same do not project above the supporting table. The pins remain in this position until the next envelop blank is about to be positioned underneath the magazine. That is to say, the next backward movement of the bar 27, will be in timing with the next backward movement of the feed bars 16. These feed bars 16, are each provided with a second set of fingers or hooks 29, which engage the blank having the patch applied thereto and move the same backward to the folding mechanism. When the hooks 29, are brought into contact with this blank, the pins 20, are lowered to permit the blank to be fed backward.

Just before the feed bars reach their backward position, the cam plate 26, will disengage the roller 25, and allow a spring 30, to swing the arms 23, overcoming the tension of the springs 22, and raise the pins above the supporting table so that the blank will be brought up against said pins and positively held from any over-throw so that it is with certainty located directly underneath the magazine 21.

When the blank is directly underneath the magazine, the same rests on a presser plate 31, which is clamped to a holder plate 32, shown in detail in Fig. XIII. This holder plate has a ledge 33, which projects over one edge of the presser plate 31, and a clamping plate 34, secured to the holder plate 32, by screws 35, clamps the other edge of the presser plate. This presser plate, as clearly shown in Figs. V, and VI, is thickened, at its ends as at 36. The holder plate 32, is provided with a slot 37, which receives a screw 38, see Fig. V. This screw permits the holder plate to be adjusted longitudinally and the presser plate may be adjusted transversely of the holder plate so that between the two adjustments the presser plate may be shifted either longitudinally or transversely of the supporting table.

The patch applying plunger 21, is of the magazine type. A stack of patches 39, is held in the magazine by retaining fingers 40, projecting laterally from the lower end of rods 41, mounted in the magazine. These rods also engage the stack of patches and hold the same, one above the other. Each of the rods 41, is carried by arms 42, which extend through the side walls of the plunger, and these arms are threaded to receive nuts 43, and 44, whereby said rods may be adjusted laterally relative to the supporting walls of the magazine, to accommodate various sizes of patches.

The magazine is carried by a reciprocating bar 45, which terminates in a head 46, at its lower end, and the magazine is adjustably secured to the said head. The top plate of the magazine is formed with a slot 47. The head 46, is formed with parallel slots 48. Bolts 49, pass through the slots 47, and 48. By releasing these bolts, the magazine may be shifted laterally of the supporting table by a movement of the bolts in the slot 47. The magazine may also be shifted longitudinally of the supporting table by a movement of the bolts in the slots 48. I have thereby provided an adjustment for the magazine which permits the same to be shifted transversely of the table, or longitudinally of the table, in the same manner that the presser plate 31, is shifted.

In Fig. X, of the drawings I have shown an envelop 50, having an opening 51, located adjacent one edge thereof. In Fig. XI, the envelop 50, has an opening 52, located centrally thereof. In Fig. XII, I have shown an envelop having an opening 53, located adjacent one end thereof.

The above adjustments of the plunger and the presser plate permit the machine to be readily and quickly adjusted so as to apply the patch to an opening in the envelop blank corresponding to the various locations of the opening in the finished envelops above referred to.

A stripper 54, is carried by the plunger 21. This stripper, as clearly shown in Fig. VI, has a rectangular opening therethrough to permit the release of the patches. The stripper 54, is carried by rods 56, located at each end of the plunger. These rods move in suitable guides and are normally pressed downward by springs 57. Collars 58, serve as abutments for the springs. Washers 59, at the upper ends of the rods limit the downward movement of the rods.

The stripper is further provided along its edges with depending portions 55ª, as indicated best in Figs. I, and II. It will be noted from these figures that the length of these portions is slightly less than the distance between the raised ends of the plate 31. In the descent of the plunger 21, the stripper is the first to engage the envelop blank so that the blank is firmly held by the portions 55ª, against the plate 31, between the raised ends 36. The end flaps of the envelop blank are thus free to be raised by the higher end portions of plate 31.

The stripper 54, is further functional in holding the envelop blank while the plunger is raised to strip the patch from the magazine.

The operation of my device is thought to be apparent from the above description. The blanks 4, are supplied with gum by the gumming devices 6, and are raised by these gumming devices so that the feed rods 16, may move underneath the envelop blanks, and a backward movement of these feed rods carries the blank underneath the magazine, and the blank will be positively positioned underneath the magazine by the feed rods and the guide pins 20. After the blank is positioned on the presser plate, the magazine descends onto the blank, and the lowermost patch in the stack in the magazine will be brought into contact with the gummed surface at the ends and sides of the opening in the blank. The thickened portion 36, raises the envelop blank adjacent the ends of the patch so as to insure the gummed sections 13, contacting with the patch, although the retaining fingers 40, for holding the patches in the magazine are at this time between the patch and the envelop blank. These retaining fingers are positioned so as to engage the blank in the spaces 14, between the gummed surfaces, and, therefore, said retaining fingers are kept free from gum, which might cause the patches to adhere to the retaining fingers. These retaining fingers may also be made of sufficient size so as to hold the patches in the magazine.

When the magazine is raised, the stripper 54, which is pressing against the envelop blank, through the action of the springs 57, will cause the blank to be held on the supporting table and the upward movement of the magazine will pull only the lower patch from the stack. A further upward movement of the magazine lifts the stripper 54, from the envelop blank and allows the feed bars to move the blank backward to the folding mechanism.

The first movement of the feed bars is to the left as viewed in Fig. III, so as to bring the second set of hooks or fingers 29, into engagement with the blank underneath the magazine, while another blank is caught by the fingers 19, ready to be moved backward by the feed bars underneath the plunger. This forward movement of the feed bars releases the pins 20, so that the blank underneath the plunger can be moved backward to the folding mechanism and the backward movement of the feed bars, after the blank has been moved from underneath the magazine, releases the fingers so that they are again raised into position for engagement with the next blank.

From the above construction it will be apparent that I have provided an envelop machine wherein the patch may, with certainty, be attached to the envelop blank, and only the patch which is attached to the blank will be withdrawn from the magazine containing the patches. I have also provided means for insuring the attachment of the patch both along its sides and ends to the envelop blank, and I have further provided means for positively positioning the blank underneath the magazine, so that the patch will be applied in proper relation to the opening in the envelop. I have also provided means whereby the patch applying devices may be quickly and readily adjustable to position the same in proper relation to the opening of the envelop.

It is obvious that minor changes in the details of construction and the arrangement of parts may be made without departing from the spirit of the invention, as set forth in the appended claims.

Having thus described my invention, I claim:

1. An envelop machine comprising means for applying gum adjacent an opening in the envelop blank, and means for applying a patch to the envelop blank to cover said opening, said last-named means including a magazine, a supporting table, a presser plate on said table and raised above the surface thereof, said presser plate being of substantially the same area as the patch and disposed beneath the magazine and supporting the envelop blank, said presser plate having thickened ends adapted to raise the envelop blank into contact with the ends of the patch, and means for giving the magazine and presser plate a relative movement for causing the patch to engage the envelop blank on the presser plate.

2. An envelop machine comprising means for applying gum adjacent an opening in the blank and means for applying a patch to the envelop blank to cover said opening, including a magazine, a support for the blank beneath the magazine, means for giving the magazine and support a relative movement, a rod at each end of the magazine, means for yieldingly depressing the rods, means for limiting the downward movement of the rods, a stripper attached to said rods, said stripper having a rectangular opening therein through which the patches are applied to the envelop blank, and said stripper along each side thereof having downwardly projecting portions engaging the blank for stripping the blank and patch from the magazine.

3. An envelop machine comprising means for applying gum adjacent an opening in the blank and means for applying a patch to the envelop blank to cover said opening, including a magazine, a support for the blank beneath the magazine, means for giving the magazine and support a relative movement, laterally projecting lugs carried by said magazine at each end thereof, a rod at each end of the magazine mounted to reciprocate vertically in said lugs, a spring for yieldingly forcing each rod downwardly, means for limiting the downward movement of the rods, a stripper plate carried by the rods, said stripper having a rectangular opening therethrough through which the patches are applied to the blank, and said stripper also having downwardly projecting portions for engaging the blanks for holding the same when the magazine is raised for stripping the blank and patch from the magazine.

4. An envelop machine comprising means for applying gum adjacent an opening in the blank, and means for applying a patch to the envelop blank to cover said opening, including a magazine for the patches, a presser plate coöperating with said magazine, said presser plate having thickened ends adapted to raise the envelop blank into contact with the ends of the patches.

5. An envelop machine comprising means for applying gum adjacent an opening in the blank, and means for applying a patch to the envelop blank to cover said opening, including a magazine for the patches, a presser plate coöperating with said magazine, said presser plate having thickened ends adapted to raise the envelop blank into contact with the ends of the patches, and retaining fingers for holding the patches in said magazine.

6. An envelop machine comprising means for applying gum adjacent an opening in the blank, and means for applying a patch to the envelop blank to cover said opening, including a magazine for the patches, a presser plate coöperating with said magazine, said presser plate having thickened ends adapted to raise the envelop blank into contact with the ends of the patches, retaining fingers for holding the patches in said magazine, and strippers carried by the magazine for engaging the envelop blank for stripping the blank with the attached patch from the magazine.

7. An envelop machine comprising means for applying gum along the side edges and at the ends of an opening in the blank, whereby ungummed spaces are formed, and means for applying the patch to the envelop blank to cover said opening, including a magazine for the patches, retaining fingers for holding the patches in the magazine, said retaining fingers being disposed so as to engage the ungummed sections of the envelop, a presser plate for pressing the envelop blank against the lowermost patch in the magazine, said presser plate having thickened ends for raising the blank into engagement with the gummed sections at the end of the opening.

8. An envelop machine comprising means for applying gum along the side edges and at the ends of an opening in the blank, whereby ungummed spaces are formed, and means for applying the patch to the envelop blank to cover said opening, including a magazine for the patches, retaining fingers for holding the patches in the magazine, said retaining fingers being disposed so as to engage the ungummed sections of the envelop blank, a presser plate for pressing the envelop blank against the lowermost patch in the magazine, said presser plate having thickened ends for raising the blank into engagement with the gummed sections at the end of the opening, and a stripper carried by the plunger for engaging the envelop blank for stripping the said blank with the attached patch from the plunger.

9. An envelop machine comprising a magazine for applying a patch to an opening in the envelop blank to cover said opening, a reciprocating member for supporting said magazine, a transversely extending plate carried by said member, said plate having slots therein and said magazine having a slot therein extending in a direction at right angles to the slots in said plate and adapted to register in part with the slots in the plate respectively, and bolts extending through said slots for securing the magazine to said plate, whereby said magazine may be adjusted longitudinally and transversely relative to said reciprocating member.

10. An envelop machine comprising a magazine for applying a patch to an opening in the envelop blank to cover said opening, means for reciprocating said magazine, means for feeding the blanks underneath the magazine, guide pins coöperating with said feeding means for positively positioning the blank underneath the magazine, means whereby said magazine may be adjusted transversely and longitudinally relative to its reciprocating means, and the positioning means for the blank, a presser plate coöperating with said magazine, and means whereby said presser plate may be adjusted to correspond to the adjustments of the magazine.

11. An envelop machine comprising a magazine for applying a patch to an opening in an envelop blank to cover said opening, means for reciprocating said magazine, means for feeding the blanks beneath the magazine, devices coöperating with the feeding means for positively positioning the blanks beneath the magazine, a presser plate coöperating with the magazine, and means whereby the presser plate may be adjusted longitudinally and transversely relative to the reciprocating means for the magazine and the positioning means for the blanks.

In testimony whereof, I have hereunto signed my name at Philadelphia, Pennsylvania, this nineteenth day of December, 1913.

GEORGE W. SMITH.

Witnesses:
JAMES H. BELL,
E. L. FULLERTON.